US006794080B2

(12) United States Patent
Sennoun et al.

(10) Patent No.: US 6,794,080 B2
(45) Date of Patent: Sep. 21, 2004

(54) ELECTROCHEMICAL ENERGY CONVERSION

(75) Inventors: Mohammed E. Sennoun, Pittsford, NY (US); Gerald E. Voecks, Fairport, NY (US); Gerald W. Fly, Geneseo, NY (US); Gary M. Robb, Lima, NY (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/732,499

(22) Filed: Dec. 10, 2003

(65) Prior Publication Data

US 2004/0137317 A1 Jul. 15, 2004

Related U.S. Application Data

(60) Provisional application No. 60/439,247, filed on Jan. 10, 2003.

(51) Int. Cl.$^7$ ................................................ H01M 4/86
(52) U.S. Cl. ............................. 429/40; 429/41; 429/44; 429/38; 429/39; 361/502
(58) Field of Search .............................. 429/40, 41, 44, 429/38, 39; 361/502

(56) References Cited

U.S. PATENT DOCUMENTS

| 3,115,427 A | 12/1963 | Rightmire | 136/86 |
|---|---|---|---|
| 3,252,838 A | 5/1966 | Huber et al. | 136/86 |
| 3,425,874 A | 2/1969 | Maget et al. | 136/86 |
| 3,530,006 A | 9/1970 | Makishima et al. | 136/86 |
| 4,770,753 A | 9/1988 | Ramshaw | 204/212 |
| 5,250,370 A | 10/1993 | Faris | 429/68 |
| 5,830,593 A | 11/1998 | Nielson | 429/38 |
| 5,955,215 A * | 9/1999 | Kurzweil et al. | 429/41 |
| 6,190,792 B1 | 2/2001 | Faris et al. | 429/27 |
| 6,280,868 B1 * | 8/2001 | Badwal et al. | 429/34 |
| 6,379,828 B1 | 4/2002 | Worth | 429/14 |
| 6,458,480 B1 | 10/2002 | Morris et al. | 429/69 |
| 6,558,831 B1 * | 5/2003 | Doshi et al. | 429/30 |

OTHER PUBLICATIONS

M. Hahn, et al., A 24 V Bipolar Electrochemical Double Layer Capacitor Based on Activated Glassy Carbon, Power Sources for the New Millenium, Proceedings vol. 2000–22, ppgs 9, The Electrochemical Society, Inc. Pennington, NJ (2001).

* cited by examiner

Primary Examiner—Bruce F. Bell
(74) Attorney, Agent, or Firm—Cary W. Brooks

(57) ABSTRACT

Various devices and methods for achieving electrochemical energy conversion are presented. In accordance with one embodiment, an energy conversion cell is configured to enable the first and second reactant supplies to communicate selectively with first and second catalytic electrodes of the cell. The selective communication of the first and second reactant supplies with the first and second catalytic electrodes may be attributable to alteration of the reactant supply flow paths or to movement of the first and second catalytic electrodes.

67 Claims, 8 Drawing Sheets

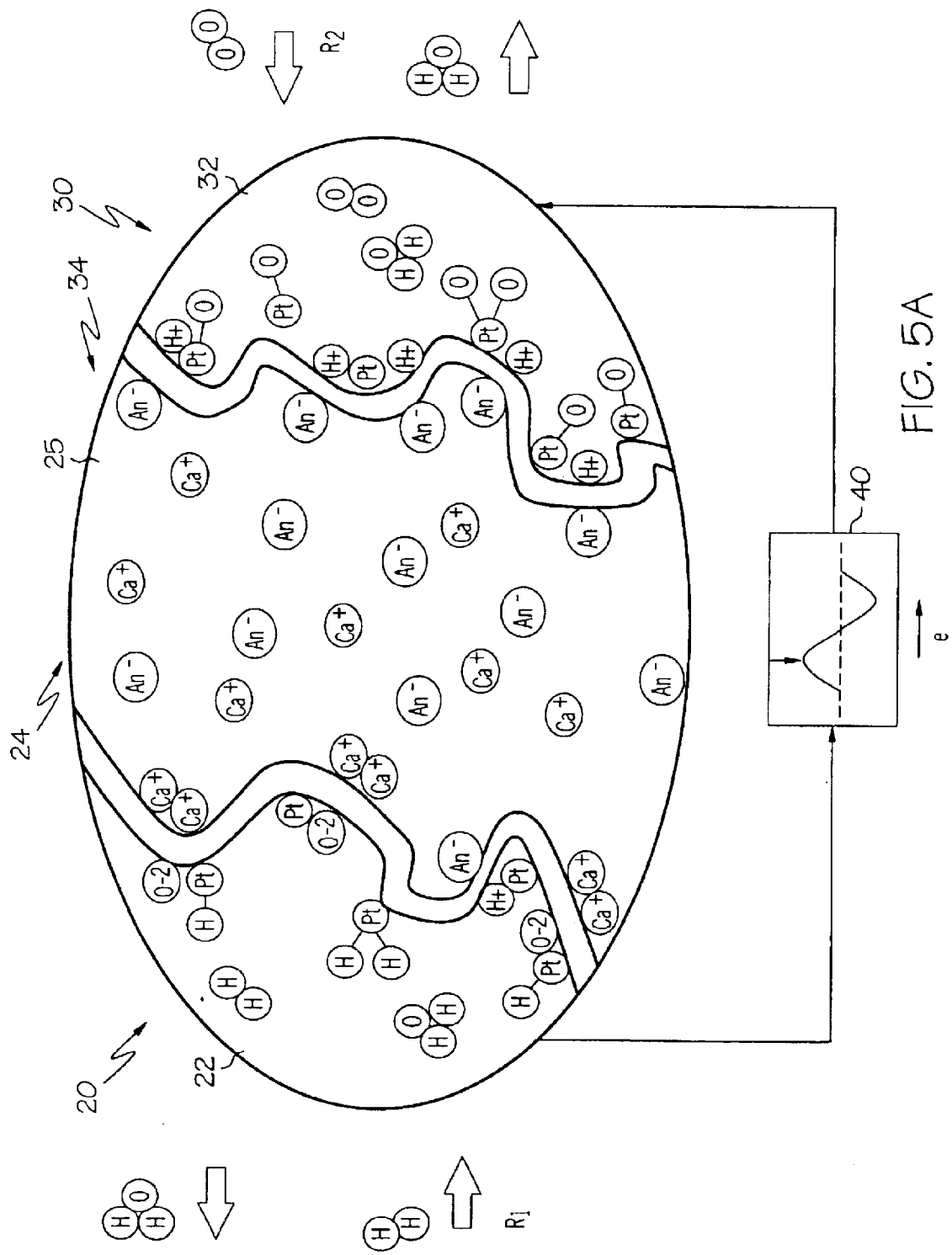

ELECTROCHEMICAL ENERGY CONVERSION

CROSS REFERENCE TO RELATED APPLICATION

This application claims the benefit of U.S. Provisional Application Serial No. 60/439,247 filed Jan. 10, 2003.

BACKGROUND OF THE INVENTION

The present invention relates to the conversion of the chemical energy of a reaction into electrical energy. The present invention is related to some extent to fuel cell technology where chemical energy of a reaction is also converted into electrical energy. The three major components that constitute the heart of a fuel cell are the fuel electrode (anode), oxygen electrode (cathode), and the electrolyte. Advancement in fuel cell technology has been limited to some extent by a number of continuing design challenges associated with durability, water management, heat management, fuel storage, fuel delivery, air delivery, coolant delivery, and power conditioning. Although the scope of the present invention is not limited to devices incorporating specific advantages or solving any particular problems, it is worth noting that the various embodiments of the present invention may be utilized to address one or more of these design challenges.

SUMMARY OF THE INVENTION

Various devices and methods for achieving electrochemical energy conversion are presented in detail herein. Additional devices and methods not specifically disclosed herein may be gleaned from the various descriptions of the present specification. In accordance with one embodiment of the present invention, an electrochemical energy conversion cell is provided. The cell comprises first and second cell portions and first and second reactant supplies. The first cell portion comprises a first catalytic electrode and a first electrolytic or polarizable dielectric portion interfaced with the first catalytic electrode. The second cell portion comprises a second catalytic electrode and a second electrolytic or polarizable dielectric portion interfaced with the second catalytic electrode. The electrochemical conversion cell is configured to inhibit substantially all transfer of ions from the first electrolytic or polarizable dielectric portion to the second electrolytic or polarizable dielectric portion. The first and second reactant supplies are in communication with the first catalytic electrode and the second catalytic electrode. The energy conversion cell is configured to enable the first and second reactant supplies to communicate selectively with the first catalytic electrode and the second catalytic electrode. The selective communication of the first and second reactant supplies with the first and second catalytic electrodes may be attributable to alteration of the reactant supply flow paths or to movement of the first and second catalytic electrodes.

In accordance with another embodiment of the present invention, an electrochemical energy conversion cell is provided. The cell comprises first and second cell portions. The first cell portion comprises a first catalytic electrode and a first electrolytic or polarizable dielectric portion interfaced with the first catalytic electrode. The second cell portion comprises a second catalytic electrode and a second electrolytic or polarizable dielectric portion interfaced with the second catalytic electrode. An ion transfer barrier is interfaced with and positioned between the first and second electrolytic or polarizable dielectric portions.

In accordance with additional embodiments of the present invention, methods of operating a device comprising an electrochemical energy conversion cell according to the present invention are provided.

Accordingly, it is an object of the present invention to provide for improved conversion of the chemical energy of a reaction into electrical energy. Other objects of the present invention will be apparent in light of the description of the invention embodied herein.

BRIEF DESCRIPTION OF THE DRAWINGS

The following detailed description of specific embodiments of the present invention can be best understood when read in conjunction with the following drawings, where like structure is indicated with like reference numerals and in which:

FIGS. 5A and 5B are schematic illustrations of different operational states of an electrochemical energy conversion cell according to another embodiment of the present invention;

DESCRIPTION OF THE PREFERRED EMBODIMENT

Figure 1:
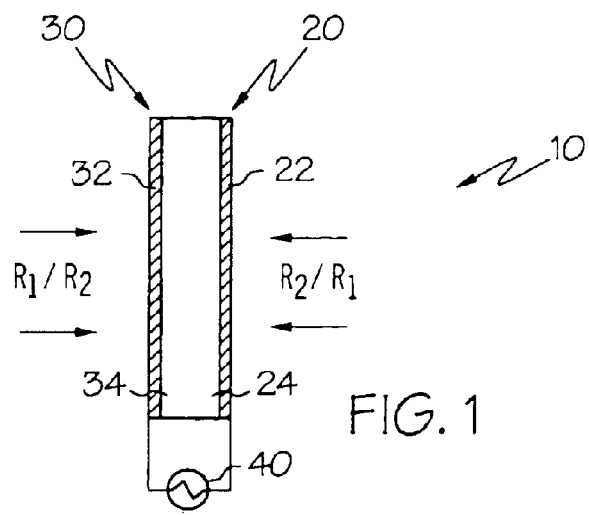
FIG. 1 is a schematic illustration of an electrochemical energy conversion cell according to the present invention.

Referring initially to FIG. 1, a schematic illustration of an electrochemical energy conversion cell 10 according to the present invention is illustrated. Generally, the electrochemical conversion cell 10 comprises first and second cell portions 20, 30 and first and second reactant supplies $R_1$, $R_2$. The first cell portion 20 comprises a first catalytic electrode 22 and a first electrolytic portion 24 interfaced with the first catalytic electrode 22. Similarly, the second cell portion 30 comprises a second catalytic electrode 32 and a second electrolytic portion 34 interfaced with the second catalytic electrode 32. As is described in detail below with reference to FIGS. 2 and 3, the first and second electrolytic portions 24, 34 may be separated by an ion transfer barrier inhibiting substantially all transfer of ions between the first and second electrolytic portions 24, 34. Alternatively, as is described in detail below with reference to FIGS. 5A and 5B, the first and second electrolytic portions 24, 34 may merely be defined as two halves of a single electrolytic material that is non-conductive to ions or a single polarizable dielectric material that is non-conductive to ions. Accordingly, the first and second electrolytic portions 24, 34 are merely illustrated schematically in FIG. 1, without reference to the particular structure that would inhibit the transfer of ions between the first and second electrolytic portions 24, 34.

As will be illustrated in detail below with respect to FIGS. 2, 3, 5A and 5B, the operability of the electrochemical conversion cell 10 does not depend upon or require that ions be transferred across the cell 10 from the first electrolytic portion 24 of the cell 10 to the second electrolytic portion 34 of the cell 10. The cell 10 may be specifically configured to inhibit the transfer of ions from the first electrolytic portion 24 to the second electrolytic portion 34. Although each of the electrolytic portions 24, 34 supports the redistribution of electrical charges within the electrolyte material, ions are not transferred across the cell 10 from the first electrolytic portion 24 to the second electrolytic portion 34.

The first and second reactant supplies $R_1$, $R_2$ are placed in communication with the first catalytic electrode 22 and the second catalytic electrode 32. As will be described in detail below with respect to the alternative embodiments illustrated in FIGS. 6–8, the energy conversion cell 10 is configured to enable the first and second reactant supplies $R_1$, $R_2$ to communicate selectively with the first catalytic electrode 22 and the second catalytic electrode 32. More specifically, the electrochemical energy conversion cell 10 is configured to alternate communication of the first and second catalytic electrodes 22, 32 between the first and second reactant supplies $R_1$, $R_2$.

Figure 6:
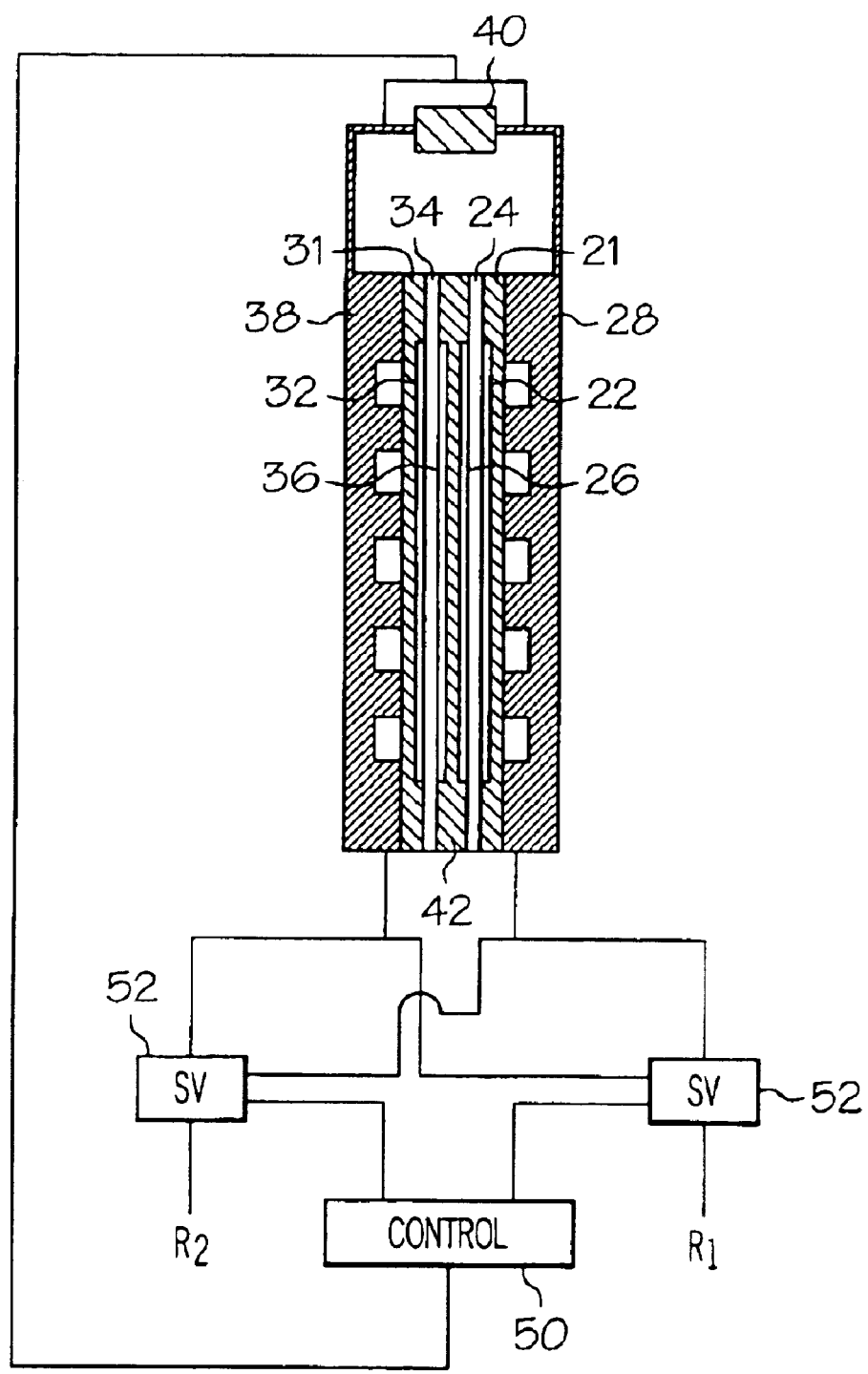
FIG. 6 is a schematic illustration of an alternative electrochemical energy conversion cell according to the present invention with particular emphasis on a suitable reactant supply for the cell.
Figure 7:
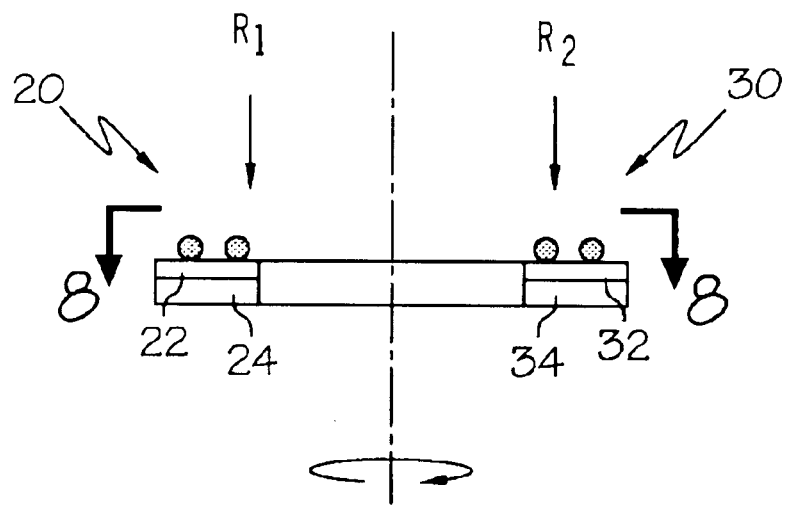
FIGS. 7 and 8 are schematic illustrations of rotary-type electrochemical energy conversion cells according to the present invention.
Figure 8:
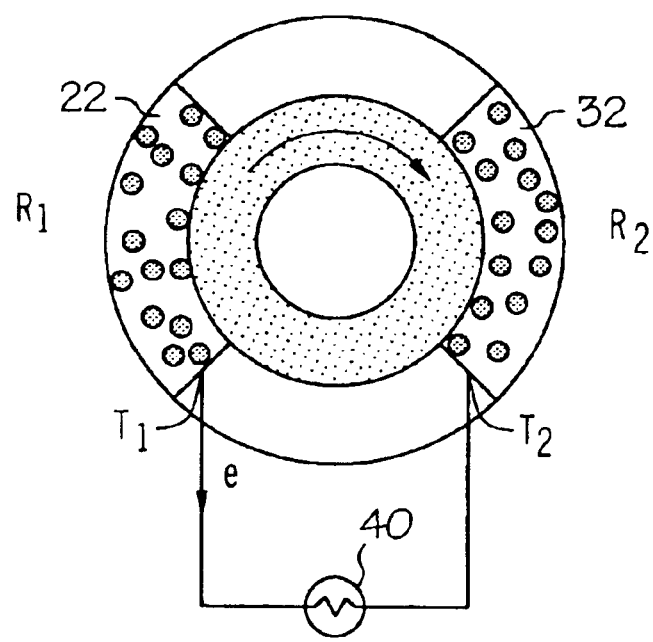

The selective communication of the first and second reactant supplies $R_1$, $R_2$ with the first and second catalytic electrodes 22, 32, may either be attributable to alteration of the flow paths of the first and second reactant supplies $R_1$, $R_2$ or to movement of the first and second catalytic electrodes 22, 32. FIG. 6 is illustrates one example of a means by which flow path alteration may be provided and FIGS. 7–8 illustrate schemes for moving the first and second catalytic electrodes. Each of these figures is discussed in detail below. It is noted that the schemes illustrated in FIGS. 6–8 are presented for illustrative purposes only and that additional schemes providing for flow path alteration and electrode movement will fall within the scope of the present invention.

Figure 2:
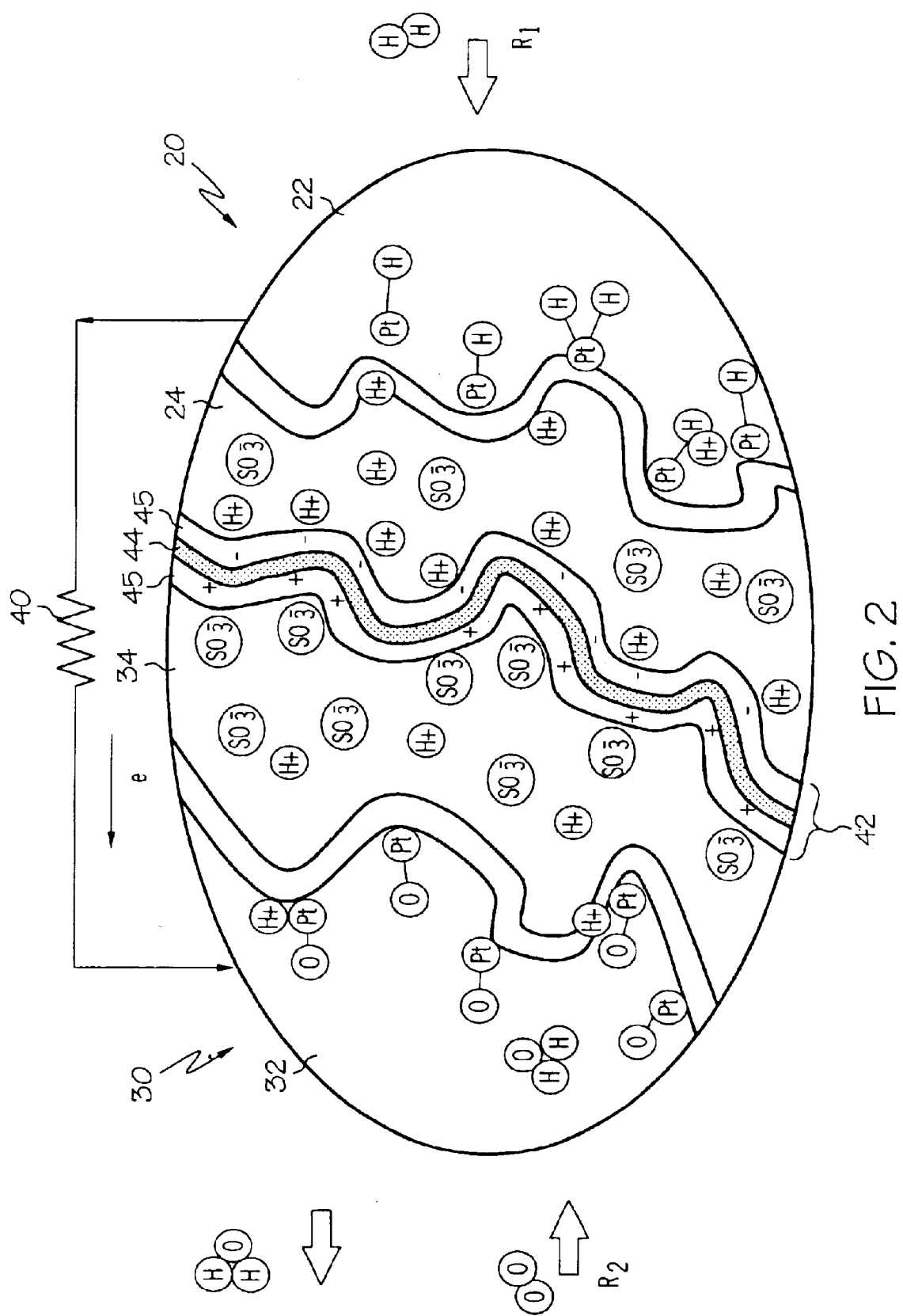
FIGS. 2 and 3 are schematic illustrations of two different operational states of an electrochemical energy conversion cell according to one embodiment of the present invention.
Figure 3:
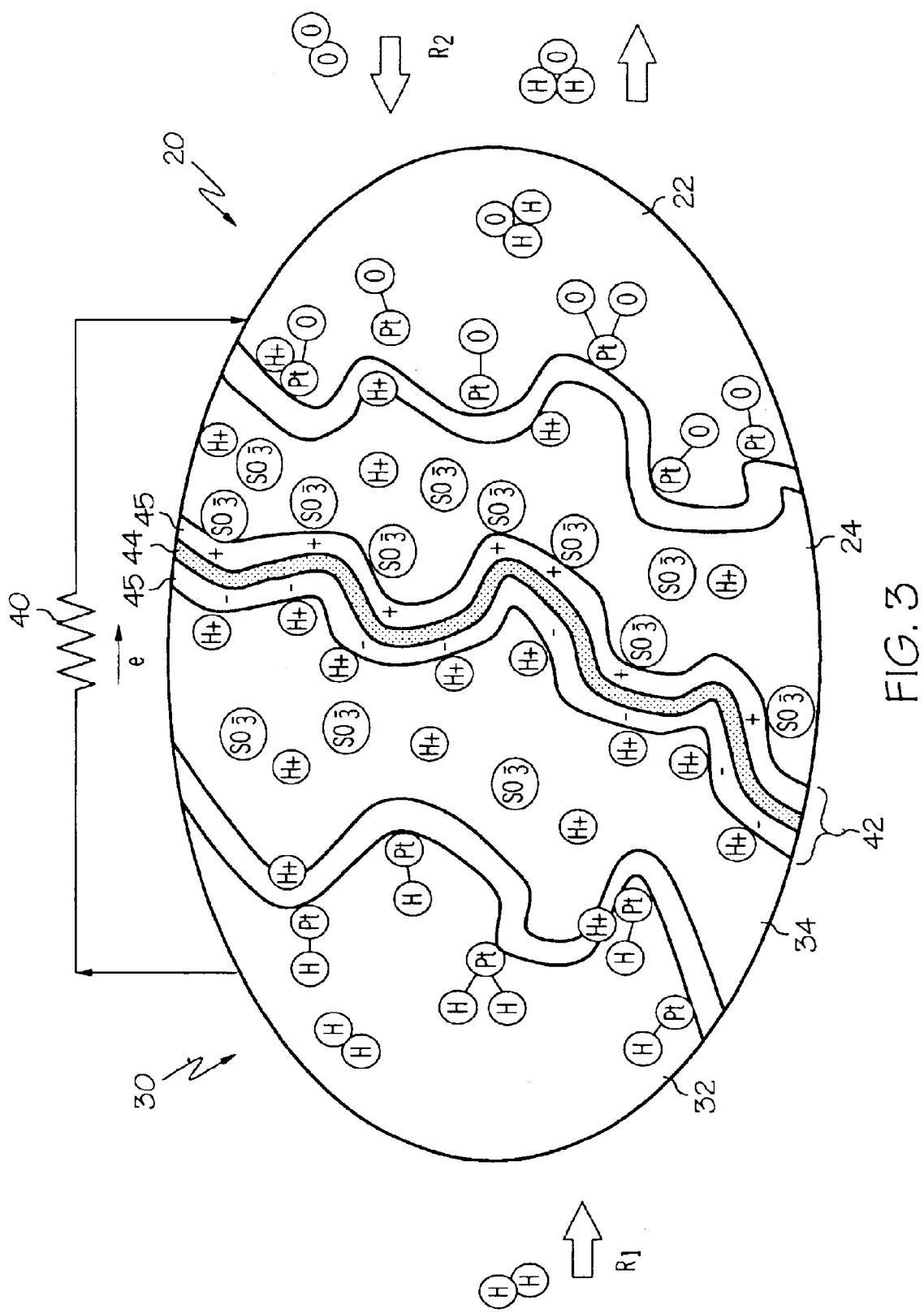

Turning now to FIGS. 2 and 3, where like structure is illustrated with like reference numerals, an enlarged portion of an electrochemical conversion cell according to one embodiment of the present invention is illustrated. The first reactant supply $R_1$ comprises an anodic reactant source containing hydrogen. The second reactant supply $R_2$ comprises a cathodic reactant source containing oxygen. As is illustrated schematically, in FIGS. 2 and 3, the anodic reactant source $R_1$ is in communication with the first catalytic electrode 22 in FIG. 2 and the second catalytic electrode 32 in FIG. 3. Conversely, the cathodic reactant source $R_2$ is in communication with the second catalytic electrode 32 in FIG. 2 and the first catalytic electrode 22 in FIG. 3.

Regarding the structure of the catalytic electrodes 22, 32, a number of suitable electrode configurations are taught in the art of electrochemical energy conversion. For example, and as is illustrated in FIGS. 2 and 3, each electrode 22, 32 may comprise a layer of high surface area conductive material, like carbon, with catalyst particles, like platinum, dispersed thereon.

Where the anodic reactant source $R_1$ comprises hydrogen, the first and second catalytic electrodes 22, 32 are configured to catalyze the following reactions:

$$2H_2 \rightarrow 4H^+ + 4e^-$$

$$2H_2 + 2O^{-2} \rightarrow 2H_2O + 4e^-$$

Where the cathodic reactant source $R_2$ comprises oxygen the first and second catalytic electrodes are configured to catalyze the following reactions:

$$O_2 + 4e^- \rightarrow 2O^{-2}$$

$$O_2 + 4H^+ + 4e^- \rightarrow 2H_2O$$

As is depicted schematically in FIG. 2, electrical current can be caused to flow across a resistive load 40 by directing oxygen, or an oxygen containing gas, to the second catalytic electrode 32 while hydrogen, or a hydrogen containing gas, is directed to the first catalytic electrode 22.

More specifically, referring to FIG. 2, when hydrogen, or a hydrogen containing gas, $R_1$ is directed to the first catalytic electrode 22, the following reaction is catalyzed:

$$2H_2 \rightarrow 4H^+ + 4e^-$$

When oxygen, or an oxygen containing gas, $R_2$ is directed to the second catalytic electrode 32, the following reaction is catalyzed:

$$O_2 + 4e^- \rightarrow 2O^{-2}$$

The presence of the two reactions at the two different electrodes 22, 32, the first yielding electrons and the second requiring electrons, results in generation of an electrical current flowing across the load 40 conductively coupled between the electrodes 22, 32.

Subsequently, referring to FIG. 3, electrical current of an opposite potential can be caused to flow across the load 40 by directing hydrogen, or a hydrogen containing gas, $R_1$ to the second catalytic electrode 32, where the following reaction is catalyzed:

$$2H_2 + 2O^{-2} \rightarrow 2H_2O + 4e^-$$

and by directing oxygen, or an oxygen containing gas, $R_2$ to the first catalytic electrode 22, where the following reaction is catalyzed:

$$O_2 + 4H^+ + 4e^- \rightarrow 2H_2O$$

Again, the presence of the two reactions at the two different electrodes 22, 32, the first yielding electrons and the second requiring electrons, results in generation of an electrical current of an opposite potential flowing across the load 40.

Successive direction of hydrogen and oxygen to the first catalytic electrode 22 in alternating succession and oxygen and hydrogen to the second catalytic electrode 32 in alternating succession, in the manner illustrated above, will result in continued generation of an alternating-type electrical current across the resistive load 40. As will be appreciated by those practicing the present invention, operation of the catalytic electrodes 22, 32 in the anodic or cathodic operational state is a function of which of the first and second reactant supplies $R_1$, $R_2$ is in communication with the first catalytic electrode 22 and the second catalytic electrode 32. By directing hydrogen and oxygen to the first and second catalytic electrodes 22 in alternating succession, the electrodes 22, 32 alternate between operational states such that the first catalytic electrode alternates between (i) an anodic operational state when the second catalytic electrode operates in a cathodic operational state and (ii) a cathodic operational state when the second catalytic electrode operates in an anodic operational state. To optimize efficiency, the electrochemical energy conversion cell may be configured such that the first and second catalytic electrodes 22, 32 are in substantially exclusive communication with different ones of the first and second reactant supplies $R_1$, $R_2$.

It is significant to note that generation of the alternating type electrical current is not dependent upon humidification of the first and second electrolytic portions 24, 34, or the transfer of water molecules or ions across the electrolytic portions 24, 34. As a result, the set of potentially suitable electrolytic materials for practicing the present invention is relatively large and may encompass more durable and lower cost materials. In addition, it is less likely that the operating temperature of the cell 10 will be limited by the design constraints introduced where humidification of an electrolyte is required. Higher operating temperatures may also yield increased cell efficiency.

As is noted above, direction of the reactants $R_1$, $R_2$ to the first and second catalytic electrodes 22, 32 may be accomplished by any one of a variety of suitable schemes. For example, it is contemplated that a reactant controller may be provided and configured to direct the reactants $R_1$, $R_2$ to different ones of the first and second catalytic electrodes 22, 32 by altering the flow paths of the anodic and cathodic reactants or by altering the position of the first and second catalytic electrodes 22, 32. It is contemplated that cell efficiency may be optimized if the reactant controller is configured to direct anodic and cathodic reactants $R_1$, $R_2$ to the first and second catalytic electrodes 22, 32 such that the reactions described above will occur simultaneously at different ones of the first and second catalytic electrodes 22, 32.

Although the present invention has been illustrated herein with specific reference to hydrogen and oxygen as the anodic and cathodic reactants, it is contemplated that a variety of reactants may be employed within the scope of the present invention. For example, suitable anodic reactants may include, but are not limited to, carbon monoxide, or any other reactant that supports the following general type of reaction in an electrochemical energy conversion cell:

$$A \rightarrow B + xe^-$$

where A and B may comprise one or more reactants (one comprising a non-charged molecule or atom and the other comprising an ion) and $xe^-$ represents a number of electrons. Similarly, suitable cathodic reactants may include, but are not limited to, chlorine, nitric oxide, or any other reactant that supports the following general type of reaction in an electrochemical energy conversion cell:

$$C + xe^- \rightarrow D$$

where C and D may comprise one or more reactants and $xe^-$ represents a number of electrons.

As is illustrated in FIGS. 2 and 3, the electrochemical energy conversion cell 10 is configured to define respective interfaces of the first electrolytic portion 24 with the first catalytic electrode 22 and the second electrolytic portion 34 with the second catalytic electrode 32. The spacing between each electrolytic portion 24, 34 and its corresponding electrode 22, 32 is illustrated schematically in FIGS. 2 and 3 but, as will be appreciated by those practicing the present invention, the spacing is a natural result of interfacing materials of dissimilar and/or non-uniform boundaries.

A charge balance capacitor structure is defined by separating the first and second cell portions 20, 30 with a charge balance membrane 42. The charge balance membrane 42 may comprise a pair of carbonaceous layers 44 and a support layer 45, as is illustrated in FIGS. 2 and 3, or any type of structure configured to separate the electrolytic portions 24, 34 of the first and second cell portions 22, 32 and function as a charge balance capacitor. The charge balance membrane 42 functions as an ion transfer barrier by inhibiting substantially all transfer of ions from between the first and second electrolytic portions 24, 34. This functionality is especially useful where the electrolytic portions would otherwise promote the transfer of ions across the cell 10. The membrane 42 may comprise, for example, a carbonaceous membrane, a dielectric membrane, a suitable electrolytic or non-electrolytic material, or any material that is substantially non-conductive of ions.

As is noted above, even if the first and second electrolytic portions 24, 34 do promote the transfer of ions across the cell 10, a carbonaceous membrane or another type of electrolytic or non-electrolytic ion transfer barrier may be provided between the first and second cell portions 20, 30 to serve as an ion transfer barrier and define the first electrolytic portion 24 and the second electrolytic portion 34.

Figure 4:
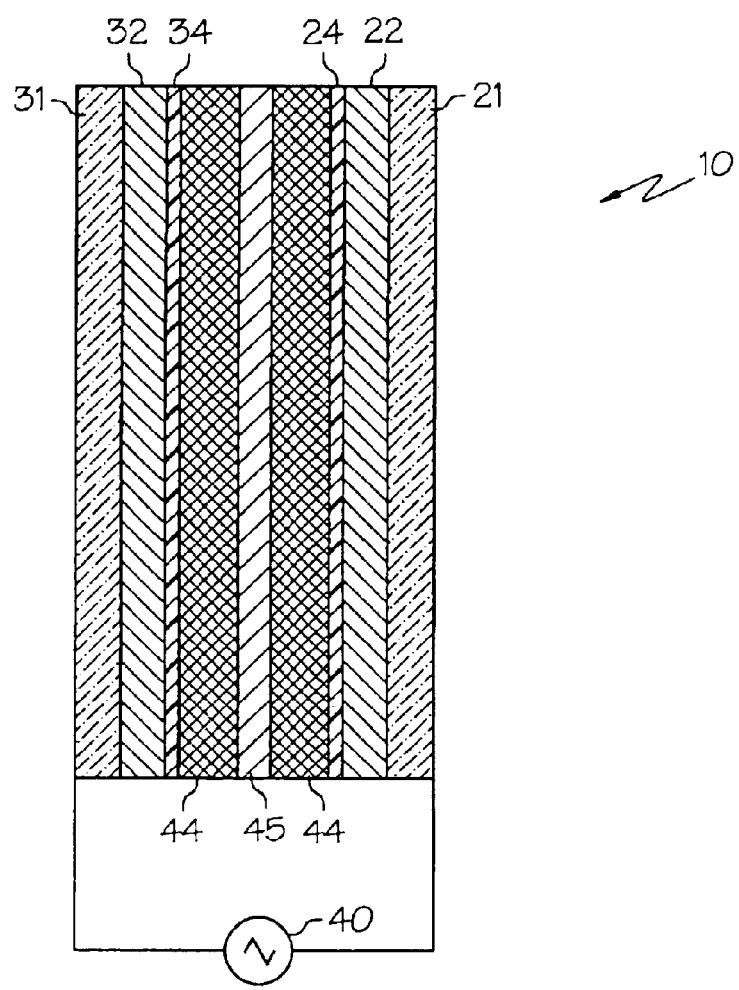
FIG. 4 is a cross-sectional schematic illustration of an electrochemical energy conversion cell according to the present invention.

In the embodiment illustrated in FIG. 4, first and second diffusion media electrodes 21, 31 are provided to define an electrical connection to the first and second catalytic electrodes 22, 32 and a flow field for passage of the reactants $R_1$, $R_2$. The particular structure of the diffusion media electrodes 21, 31 is beyond the scope of the present invention and may be gleaned from readily available teachings in the art of electrochemical conversion, hydrogen/oxygen driven fuel cells in particular. The first and second electrolytic portions 24, 34 are illustrated in FIG. 4 as supported by a single laminate comprising a pair of carbonaceous layers 44 and a single support layer 45. However, it is noted that a variety of suitable structures could be utilized in place of these three layers, provided it lends some structural integrity to the device and, if necessary, helps to inhibit the transfer of ions between the first and second electrolytic portions 24, 34. Referring specifically to the embodiment illustrated in FIG. 4, it is noted that thickness dimensions may be on the order of about 10 microns for the first and second catalytic electrodes 22, 32 and about 3–5 microns for the first and second electrolytic portions 24, 34. The carbonaceous layers 44 may comprise high surface area carbon (greater than about 1000 m²/g).

Figure 5B:
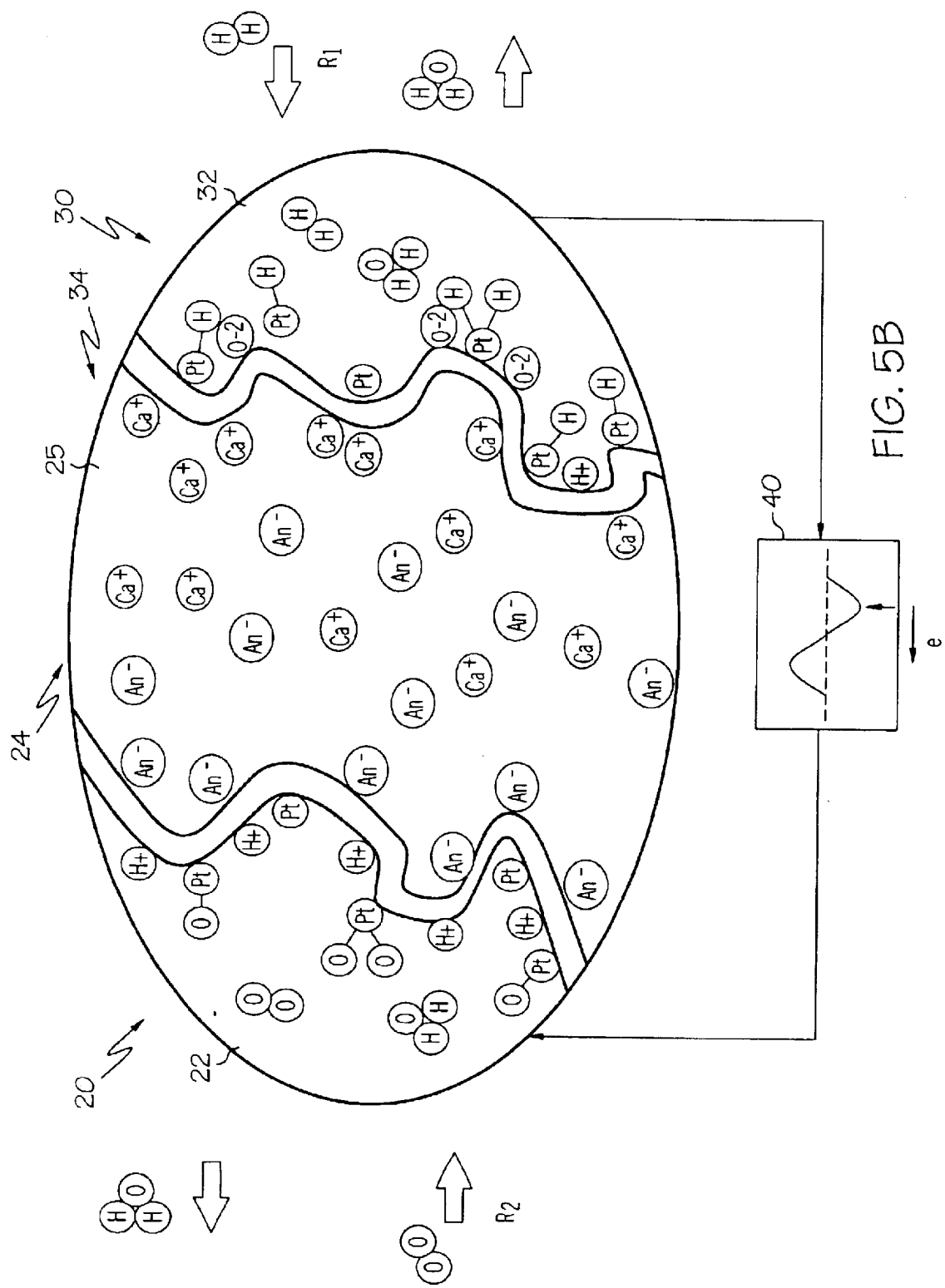

Referring to the embodiment illustrated in FIGS. 5A and 5B, where like structure is illustrated with like reference numerals, the first and second electrolytic portions 24, 34 illustrated in FIGS. 2 and 3 may be replaced by an electrolytic or polarizable dielectric ion transfer barrier material 25, i.e., a material that does not promote the transfer of ions across the cell 10. The ion transfer barrier material 25 is interfaced with the first and second catalytic electrodes 22, 32 and may comprise a suitable electrolyte or a polarizable material with a high dielectric constant.

As is illustrated in FIGS. 5A and 5B, the magnitude and polarity of the electrical current generated and the distribution of the anions $An^-$ and the cations $Ca^+$ in the first and second electrolytic portions are dependent upon which reactants $R_1$, $R_2$ are directed to the different ones of the first and second catalytic electrodes 22, 32. Specifically, referring to FIG. 5A, a high current flow condition from the first catalytic electrode 22 to the second catalytic electrode 32 is illustrated. In FIG. 5A, hydrogen, as the first reactant $R^1$, is directed to the first catalytic electrode 22, which electrode had previously been exposed to oxygen. On the other side of the cell, oxygen, as the second reactant $R_2$, is directed to the second catalytic electrode 32, which electrode had previously been exposed to hydrogen. The reactions occurring at the first and second catalytic electrodes 22, 32 are similar to those described above with reference to FIGS. 2 and 3, with the exception that the hydrogen ions $H^+$ do not enter or pass through the electrolytic or dielectric ion transfer barrier material 25. Rather, the hydrogen ions $H^+$ remain in the area of the first catalytic electrodes 22 while anions $An^-$ and cations $Ca^+$ in the electrolyte assume a distribution that balances the charges of the hydrogen ions $H^+$ and oxygen ions $O^{-2}$ in the second catalytic electrode 32.

As the exposure to the first and second reactants $R_1$, $R_2$ continues, the resulting reactions deplete the available hydrogen ions $H^+$ and oxygen ions $O^{-2}$ leading to a decrease in the electrical current flow and a redistribution of the anions $An^-$ and cations $Ca^+$ in the electrolyte. Referring to FIG. 5B, as the magnitude of the current tends towards zero, the reactant supply is controlled to direct hydrogen, as the first reactant $R_1$, to the second catalytic electrode 32 and oxygen, as the second reactant $R_2$, to the first catalytic electrode 32. The resulting reactions complete the second half of the alternating current signal and again redistribute the anions $An^-$ and the cations $Ca^+$ in the ion transfer barrier material 25, as is illustrated in FIGS. 5A and 5B.

In the embodiment of FIG. 6, respective non-catalytic layers 26, 36 of, for example, high surface area carbon, are interfaced with the respective first and second electrolytic portions 24, 34 adjoining the first and second catalytic electrodes 22, 32. In addition, an intervening ion transfer barrier charge balance membrane 42 is disposed between the two non-catalytic layers 26, 36. Further, first and second reactant distributors 28, 38 are provided in communication with the first and second diffusion media electrodes 21, 31 to create a substantially uniform distribution of reactant gases over the first and second catalytic electrodes 22, 32. As is noted briefly above, FIG. 6 also illustrates one example of a means by which flow path alteration may be provided. A reactant-controller 50 is provided in communication with a set of solenoid valves 52 to enable control over which reactant $R_1$, $R_2$ is introduced to each of the first and second cell portions 20, 30.

Referring now to the alternative embodiment of the present invention illustrated in FIGS. 7 and 8, an alternative scheme is illustrated for placing the reactant supplies $R_1$, $R_2$ in selective communication with the first and second cell portions 20, 30 by moving the first and second catalytic electrodes 22, 32. Specifically, in the embodiment of FIGS. 7 and 8, the electrochemical energy conversion cell 10 comprises a layer of conductive material that forms the first catalytic electrode 22 and the second catalytic electrode 32. The first and second catalytic electrodes 22, 32 are formed over an electrolytic support layer that forms the first and second electrolytic portions 24, 34 of the cell 10.

The layer of conductive material that forms the first catalytic electrode 22 and the second catalytic electrode 32 is referred to herein as a rotary electrode because it can be rotated through the two distinct reactant zones $R_1$, $R_2$ defined by the presence of reactants $R_1$, $R_2$. As the conductive layer rotates, portions of the layer of conductive material are in substantially exclusive communication with the first reactant supply $R_1$ while other portions of the layer of conductive material are in substantially exclusive communication with the second reactant supply $R_2$. At successive points of rotation of the rotary electrode, successive portions of the layer of conductive material are in substantially exclusive communication with the first and second reactant supplies $R_1$, $R_2$. The dynamic physical boundaries of the first catalytic electrode 22 are thus defined according to which portions of the conductive layer are in communication with the first reactant supply $R_1$. Similarly, the dynamic physical boundaries of the second catalytic electrode 32 are defined according to which portions of the conductive layer are in communication with the second reactant supply $R_2$. Reactions occurring at each electrode are as noted above in the description of the stationary electrode embodiments of the present invention, yielding current flow across the load 40 as electrons are collected and distributed at terminals represented schematically at $T_1$ and $T_2$. The terminals $T_1$ and $T_2$ are configured to collect electrons from the first catalytic electrode 22 and distribute ions on the second catalytic electrode 32 as the substantially planar rotary electrode structure rotates.

It is noted that, a proton attraction hydrophobic material may be provided proximate to one or both of the catalytic electrodes of the present invention to further improve performance. Specifically, the rate of transfer of ions to the first and second catalytic electrodes may be enhanced by the presence of the first and second proton attracting hydrophobic materials because the first and second proton attracting hydrophobic materials accept ions from the reactant supplies. Additionally, the presence of the first and second proton attracting hydrophobic materials may prevent some of the water in the reactant supplies from entering the first and second catalytic electrodes. Thus, the first and second proton attracting hydrophobic materials may prevent the catalysts on the first and second catalytic electrodes from becoming. flooded and thus reducing the catalytic activity of the first and second catalytic electrodes.

The proton attracting hydrophobic material may be bound to or distributed over the catalytic electrode to which it is positioned proximate or, more generally, may merely be positioned proximate to the first or second catalytic electrode such that it is at least close enough to the catalytic electrode to result in increased attraction of protons to the catalytic electrode. The proton attracting hydrophobic materials may for example be monolayers bound to the first or second catalytic electrodes. Of course, the presence of the proton attractive hydrophobic material should not be considered a critical or important component of the present invention.

The proton attracting hydrophobic material should comprise a compound having at least one area of strong proton attraction and at least one hydrophobic group, e.g., a hydrophobic inorganic compound having at least one area of strong proton attraction. The proton attracting hydrophobic material may comprise a compound electronically configured to bind water and having at least one area of strong proton attraction. More generally, the proton attracting hydrophobic material may comprise at least one molecule capable of attracting a proton and having hydrophobic characteristics. For the purposes of describing and defining the present invention, it is noted that a molecule may be characterized as "proton attracting" if it comprises at least one portion characterized by strong proton attraction relative to another area of the molecule or relative to a material proximate to the molecule. A molecule may be characterized as "hydrophobic" if it comprises at least one portion that repels, fails to adsorb, or otherwise lacks an affinity for water or at least one portion that is electronically configured to bind water at specific sites to block further water transfer.

The areas of proton attraction may be localized on the molecule. Additionally, the areas of strong proton attraction may be provided by incorporating a strong base functional group. For example, the first and second proton attracting hydrophobic materials could have a strong Bronsted base functional group. The first and second proton attracting hydrophobic materials generally have an ionization constant of greater than about 12.5 pKa.

The hydrophobic characteristic of the first and second proton attracting hydrophobic materials may be provided in any suitable manner. For example, the molecule may have a hydrophobic organic backbone or a hydrophobic inorganic component. The molecule may have hydrophobic groups incorporated in the structure of a strong proton attracting area. The molecule may also be electronically configured to bind water at specific sites to block further water transfer. Additionally, the first and second proton attracting hydrophobic materials may be complexed with a noble metal to provide molecules having a catalyst site at the immediate transfer location of the proton. The first and second proton attracting hydrophobic materials are generally selected to be stable at the operating conditions of the device.

Examples of suitable organic proton attracting hydrophobic materials 20 include, but are not limited to, 1,6-diazabicyclo[4.4.4]tetradecane and tricyclic tetraamine[$2^\circ$] adamanzane. Examples of suitable inorganic proton attracting hydrophobic materials 20 include, but are not limited to phosphaboranes, phosphacarboranes, and carboranes. Examples of suitable proton attracting hydrophobic materials 20 being complexed with a noble metal include, but are not limited to, 1,8-bis(diorganophophino)naphthalene Pt(II) complexes and [{eta(6).eta(1).eta(1)-$C_6H_3(CH_3)$-5-[$CH_2$-2-$C_6F_4P(C_6F_5)CH_2$](2)-1,3}RuCl]+ complexes. It will be apparent to those having skill in the art that suitable proton attracting hydrophobic materials may be engineered to a have desired areas of strong proton attraction and hydrophobic characteristics.

Figure 9:
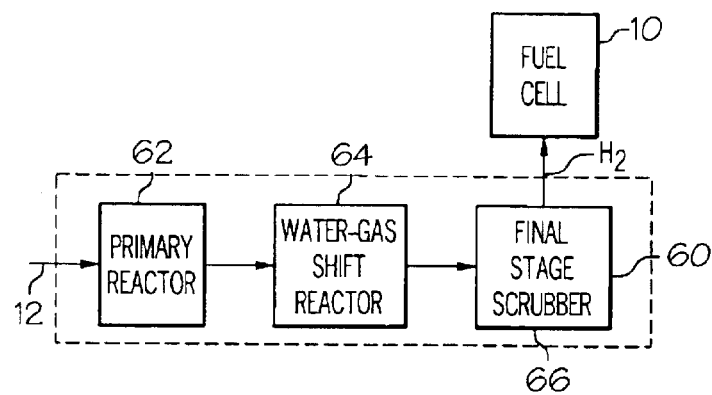
FIG. 9 is a schematic illustration of a reactant processing system and an electrochemical energy conversion cell according to the present invention.

The device of the present invention may further comprise a reactant processing system 60. For example, referring to FIG. 9, a reactant processing system 60 for supplying hydrogen to the electrochemical energy conversion cell 10 of the present invention is illustrated. A primary reactor 62, a water-gas shift reactor 64, and a final stage scrubber 66 may be utilized to provide hydrogen gas $H_2$ to the cell 10. In the primary reactor 62, a reactant mixture R that may contain a hydrocarbon fuel stream and an oxygen-containing stream is flowed into the primary reactor 62. The oxygen-containing stream may comprise air, steam, and combinations thereof. The reactant mixture R may be formed by mixing a hydrocarbon fuel with a preheated air and steam input stream before flowing the reactant mixture into the primary reactor. After the reactant mixture R is flowed into the primary reactor 62, the reactant mixture R passes over at least one reaction zone having at least one reforming catalyst and product gas stream containing hydrogen is produced catalytically. The product gas stream may be passed through a water-gas shift reactor 64 and a final stage scrubber 66 in order to reduce impurities such as carbon monoxide. Once impurities have been removed, the hydrogen stream $H_2$ may be used to fuel the fuel cell 10.

Figure 10:
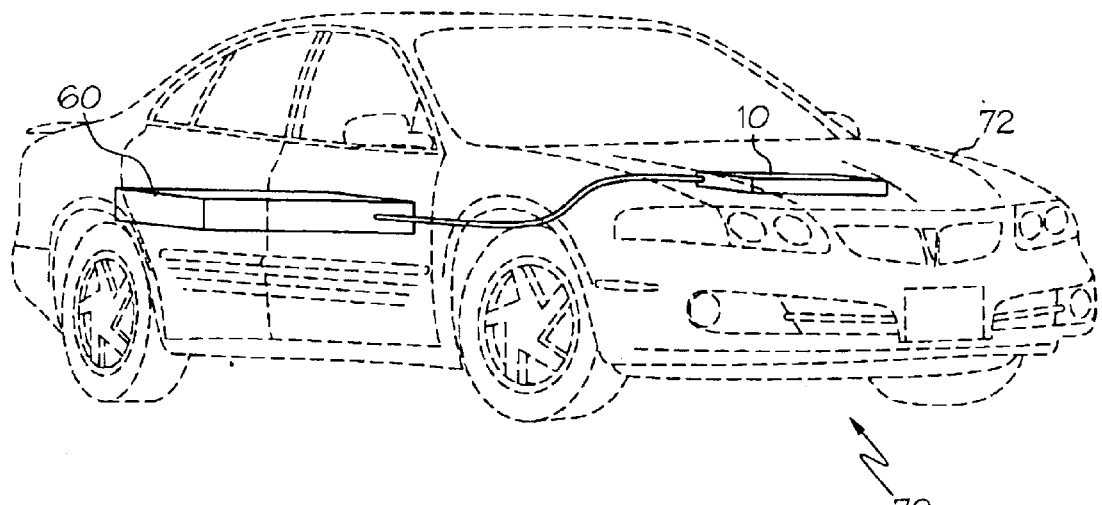
FIG. 10 is a schematic illustration of a vehicle having a fuel processing system and an electrochemical energy conversion cell according to the present invention.

Referring to FIG. 10, the device of the present invention may be a vehicle 70 and the vehicle may have a vehicle body 72 and at least one electrochemical catalytic reaction cell comprising a electrochemical energy conversion cell 10. The cell 10 is configured to at least partially provide the vehicle body 72 with motive power. The vehicle 70 may also have a reactant processing system 60 for supplying the fuel cell 10 with a reactant. It will be understood by those having skill in the art that the cell 10 and the fuel processing system 60 are shown schematically and may be used or placed in any suitable manner within the vehicle body 72.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. For example, although the present invention has been illustrated with reference to a single electrochemical energy conversion cell, it is noted that devices according to the present invention may comprise a plurality of electrically interconnected cells. Similarly, although specific embodiments of the present invention are illustrated with reference to particular reactants $R_1$, $R_2$ and catalyst materials, like Pt, a variety of similarly functioning reactants and catalysts may be employed. In addition, although some aspects of the present invention are identified herein as preferred or particularly advantageous, it is contemplated that the present invention is not necessarily limited to these preferred aspects of the invention.

What is claimed is:

1. A device comprising an electrochemical energy conversion cell, wherein said electrochemical conversion cell comprises:

a first cell portion comprising
        a first catalytic electrode, and
        a first electrolytic or polarizable dielectric portion interfaced with said first catalytic electrode;

a second cell portion comprising
        a second catalytic electrode, and
        a second electrolytic or polarizable dielectric portion interfaced with said second catalytic electrode, wherein said electrochemical conversion cell is configured to inhibit substantially all transfer of ions from said first electrolytic or polarizable dielectric portion to said second electrolytic or polarizable dielectric portion; and first and second reactant supplies in communication with said first catalytic electrode and said second catalytic electrode, wherein said energy conversion cell is configured to enable said first and second reactant supplies to communicate selectively with said first catalytic electrode and said second catalytic electrode.

2. A device as claimed in claim 1 wherein said first and second reactant supplies comprise alterable flow paths and said selective communication of said first and second reactant supplies with said first and second catalytic electrodes is attributable to alteration of said flow paths.

3. A device as claimed in claim 1 wherein said first and second catalytic electrodes are movable and said selective communication of said first and second reactant supplies with said first and second catalytic electrodes is attributable to said mobility of said first and second catalytic electrodes.

4. A device as claimed in claim 1 wherein said electrochemical energy conversion cell is further configured to alternate communication of said first and second catalytic electrodes between said first and second reactant supplies.

5. A device as claimed in claim 4 wherein said electrochemical energy conversion cell is configured to alternate said communication between said first and second reactant supplies by altering flow paths of said first and second reactant supplies.

6. A device as claimed in claim 4 wherein said electrochemical energy conversion cell is configured to alternate said communication between said first and second reactant supplies by moving said first and second catalytic electrodes.

7. A device as claimed in claim 1 wherein said first reactant supply comprises an anodic reactant source and said second reactant supply comprises a cathodic reactant source.

8. A device as claimed in claim 7 wherein said anodic reactant source is in selective communication with said first and second catalytic electrodes and said cathodic reactant source is in selective communication with said first and second catalytic electrodes.

9. A device as claimed in claim 7 wherein said anodic reactant source comprises hydrogen.

10. A device as claimed in claim 9 wherein said first and second catalytic electrodes are configured to catalyze the following reactions:

$$2H_2 \rightarrow 4H^+ + 4e^-$$

$$2H_2 + 2O^{-2} \rightarrow 2H_2O + 4e^-$$

11. A device as claimed in claim 7 wherein said cathodic reactant source comprises oxygen.

12. A device as claimed in claim 11 wherein said first and second catalytic electrodes are configured to catalyze the following reactions:

$$O_2 + 4e^- \rightarrow 2O^{-2}$$

$$O_2 + 4H^+ + 4e^- \rightarrow 2H_2O.$$

13. A device as claimed in claim 1 further comprising a reactant controller configured to:
   direct an anodic reactant and a cathodic reactant to said first catalytic electrode in alternating succession; and
   direct a cathodic reactant and an anodic reactant to said second catalytic electrode in alternating succession.

14. A device as claimed in claim 13 wherein said reactant controller is configured to direct said reactants by altering the flow paths of said anodic and cathodic reactants.

15. A device as claimed in claim 13 wherein said reactant controller is configured to direct said reactants by altering the position of said first and second catalytic electrodes.

16. A device as claimed in claim 1 further comprising a reactant controller configured to direct anodic and cathodic reactants to said first and second catalytic electrodes such that the following reactions occur simultaneously at different ones of said first and second catalytic electrodes:

$$A \rightarrow B + xe^-$$

$$C + xe^- \rightarrow D$$

where A, B, C, and D each comprise one or more reactants and $xe^-$ represents a number of electrons.

17. A device as claimed in claim 16 wherein said anodic reactant comprises hydrogen and said cathodic reactant comprises oxygen.

18. A device as claimed in claim 16 wherein said reactant controller is configured to direct said anodic and cathodic reactants to said first and second catalytic electrodes such that said reaction $A \rightarrow B + xe^-$ comprises at least one of the following reactions:

$$2H_2 \rightarrow 4H^+ + 4e^-$$

$$2H_2 + 2O^{-2} \rightarrow 2H_2O + 4e^-$$

19. A device as claimed in claim 16 wherein said reactant controller is configured to direct said anodic and cathodic reactants to said first and second catalytic electrodes such that said reaction $C + xe^- \rightarrow D$ comprises at least one of the following reactions:

$$O_2 + 4e^- \rightarrow 2O^{-2}$$

$$O_2 + 4H^+ + 4e^- \rightarrow 2H_2O.$$

20. A device as claimed in claim 16 wherein said reactant controller is further configured to:
   direct a cathodic reactant to said second catalytic electrode, while said anodic reactant is directed to said first catalytic electrode; and
   direct an anodic reactant to said second catalytic electrode, while said cathodic reactant is directed to said first catalytic electrode.

21. A device as claimed in claim 1 wherein said electrochemical energy conversion cell is configured such that said first and second catalytic electrodes are in substantially exclusive communication with different ones of said first and second reactant supplies.

22. A device as claimed in claim 1 wherein said first electrolytic or polarizable dielectric portion and said second electrolytic or polarizable dielectric portion are defined by different portions of a common membrane.

23. A device as claimed in claim 22 wherein said common membrane does not transport ions through from one catalytic layer to the opposite catalytic layer.

24. A device as claimed in claim 1 wherein said first electrolytic or polarizable dielectric portion and said second electrolytic or polarizable dielectric portion are defined by respective separate membranes.

25. A device as claimed in claim 24 wherein said respective separate electrolytic membranes are separated by an ion transfer barrier.

26. A device as claimed in claim 24 wherein said respective separate electrolytic membranes are separated by a carbonaceous material.

27. A device as claimed in claim 1 wherein said electrochemical energy conversion cell is configured such that said first and second electrolytic or polarizable dielectric portions are not subject to substantial humidification.

28. A device as claimed in claim 1 wherein said first cell portion of said energy conversion cell is separated from said second cell portion of said energy conversion cell by an ion transfer barrier.

29. A device as claimed in claim 28 wherein said ion transfer barrier comprises a membrane.

30. A device as claimed in claim 28 wherein said ion transfer barrier comprises an electrolytic material.

31. A device as claimed in claim 28 wherein said ion transfer barrier comprises a carbonaceous material.

32. A device as claimed in claim 28 wherein said ion transfer barrier is configured to comprise a charge balance capacitor.

33. A device as claimed in claim 1 wherein said first cell portion of said energy conversion cell is coupled to said second cell portion of said energy conversion cell through a common electrolytic membrane.

34. A device as claimed in claim 33 wherein said common electrolytic membrane comprises an electrolytic material configured to inhibit substantially all transfer of ions therein.

35. A device as claimed in claim 33 wherein said common electrolytic membrane is interfaced with said first and second catalytic electrodes.

36. A device as claimed in claim 1 wherein said first cell portion of said energy conversion cell is mechanically coupled to said second cell portion of said energy conversion cell.

37. A device as claimed in claim 1 wherein said electrochemical energy conversion cell is configured such that generation of electrochemical energy there from is not dependent upon humidification of said first and second electrolytic or polarizable dielectric portions.

38. A device as claimed in claim 1 wherein said first and second electrolytic or polarizable dielectric portions resist transfer of water molecules there through.

39. A device as claimed in claim 1 wherein said energy conversion cell is configured to enable said first and second catalytic electrodes to alternate between operational states such that said first catalytic electrode alternates between (i) an anodic operational state when said second catalytic electrode operates in a cathodic operational state and (ii) a cathodic operational state when said second catalytic electrode operates in an anodic operational state.

40. A device as claimed in claim 39 wherein said energy conversion cell is configured such that operation of said catalytic electrodes in a given one of said anodic and cathodic operational states is a function of which of said first and second reactant supplies are in communication with said first catalytic electrode and said second catalytic electrode.

41. A device as claimed in claim 1 wherein said electrochemical energy conversion cell comprises a first layer of conductive material forming at least a portion of said first catalytic electrode and a second layer of conductive material forming at least a portion of said second catalytic electrode.

42. A device as claimed in claim 41 wherein said first and second layers of conductive material are separated by an ion transfer barrier.

43. A device as claimed in claim 41 wherein said electrochemical energy conversion cell is configured such that said first and second layers of conductive material are in substantially exclusive communication with different ones of said first and second reactant supplies.

44. A device as claimed in claim 1 wherein said electrochemical energy conversion cell comprises a layer of conductive material forming said first catalytic electrode and said second catalytic electrode.

45. A device as claimed in claim 44 wherein said layer of conductive material is formed over an ion transfer barrier.

46. A device as claimed in claim 44 wherein said electrochemical energy conversion cell is configured such that portions of said layer of conductive material are in substantially exclusive communication with said first reactant supply while other portions of said layer of conductive material are in substantially exclusive communication with said second reactant supply.

47. A device as claimed in claim 44 wherein said layer of conductive material comprises a rotary electrode.

48. A device as claimed in claim 47 wherein said layer of conductive material comprises a substantially planar rotary electrode.

49. A device as claimed in claim 47 wherein said electrochemical energy conversion cell is configured such that, at any given point of rotation of said rotary electrode, portions of said layer of conductive material are in substantially exclusive communication with said first reactant supply while other portions of said layer of conductive material are in substantially exclusive communication with said second reactant supply.

50. A device as claimed in claim 49 wherein said electrochemical energy conversion cell is configured such that, at successive points of rotation of said rotary electrode, successive portions of said layer of conductive material are in substantially exclusive communication with said first and second reactant supplies.

51. A device as claimed in claim 1 wherein at least one of said first and second cell portions further comprise a proton attracting hydrophobic material comprising at least one proton attracting hydrophobic molecule positioned proximate to at least one of said first and second catalytic electrodes.

52. A device as claimed in claim 51 wherein both of said first and second cell portions comprise a proton attracting hydrophobic material comprising at least one proton attracting hydrophobic molecule positioned proximate to said first and second catalytic electrodes.

53. A device as claimed in claim 51 wherein said proton attracting hydrophobic material is bound to said catalytic electrode to which it is positioned proximate.

54. A device as claimed in claim 51 wherein said proton attracting hydrophobic material comprises a compound having at least one area of strong proton attraction and at least one hydrophobic group.

55. A device as claimed in claim 51 wherein said proton attracting hydrophobic material comprises a hydrophobic inorganic compound having at least one area of strong proton attraction.

56. A device as claimed in claim 51 wherein said proton attracting hydrophobic material comprises a compound electronically configured to bind water and having at least one area of strong proton attraction.

57. A device as claimed in claim 1 wherein said device comprises a plurality of said electrochemical energy conversion cells.

58. A device as claimed in claim 1 wherein said device further comprises a reactant processing system in communication with at least one of said first and second reactant supplies.

59. A device as claimed in claim 58 wherein said reactant processing system is configured to provide hydrogen gas.

60. A device as claimed in claim 59 wherein said reactant processing system comprises a primary reactor, a water-gas shift reactor, and a final stage scrubber.

61. A device as claimed in claim 1 wherein:
said device further comprises a vehicle body and a motive mechanism configured to impart motion to said vehicle body in response to a supply of electrical energy; and
said electrochemical energy conversion cell is configured to supply said electrical energy.

62. A device as claimed in claim 61 wherein said device further comprises a reactant processing system in communication with said electrochemical energy conversion cell.

63. A device comprising an electrochemical energy conversion cell, wherein said electrochemical conversion cell comprises:
a first cell portion comprising
a first catalytic electrode, and
a first electrolytic or polarizable dielectric portion interfaced with said first catalytic electrode;
a second cell portion comprising
a second catalytic electrode, and
a second electrolytic or polarizable dielectric portion interfaced with said second catalytic electrode, wherein said electrochemical conversion cell is configured to inhibit substantially all transfer of ions from said first electrolytic or polarizable dielectric portion to said second electrolytic or polarizable dielectric portion; and
an ion transfer barrier interfaced with and positioned between said first and second electrolytic or polarizable dielectric portions, wherein said ion transfer barrier comprises a charge balance capacitor structure.

64. A device comprising an electrochemical energy conversion cell, wherein said electrochemical conversion cell comprises:
- a first cell portion comprising
  - a first catalytic electrode, and
  - a first electrolytic or polarizable dielectric portion interfaced with said first catalytic electrode;
- a second cell portion comprising
  - a second catalytic electrode, and
  - a second electrolytic or polarizable dielectric portion interfaced with said second catalytic electrode; and
- first and second reactant supplies in communication with said first catalytic electrode and said second catalytic electrode, wherein said device is configured to enable said first and second reactant supplies to communicate selectively with said first catalytic electrode and said second catalytic electrode.

65. A method of operating a device comprising an electrochemical energy conversion cell, said method comprising the acts of:
- designating first and second cell portions of said electrochemical energy conversion cell, said first cell portion comprising
  - a first catalytic electrode, and
  - a first electrolytic or polarizable dielectric portion interfaced with said first catalytic electrode, and said second cell portion comprising
- a second catalytic electrode, and
- a second electrolytic or polarizable dielectric portion interfaced with said second catalytic electrode, wherein said electrochemical conversion cell is configured to inhibit substantially all transfer of ions from said first electrolytic or polarizable dielectric portion to said second electrolytic or polarizable dielectric portion; and operating first and second reactant supplies in communication with said first catalytic electrode and said second catalytic electrode such that said first and second reactant supplies communicate selectively with said first catalytic electrode and said second catalytic electrode.

66. A method as claimed in claim 65 wherein said first and second reactant supplies are placed in selective communication with said first and second catalytic electrodes by altering flow paths of said first and second reactant supplies.

67. A method as claimed in claim 65 wherein said first and second reactant supplies are placed in selective communication with said first and second catalytic electrodes by moving said first and second catalytic electrodes.

* * * * *